United States Patent [19]

Harkness

[11] 3,928,027
[45] Dec. 23, 1975

[54] NONSWELLING ALLOY

[75] Inventor: Samuel D. Harkness, W. Simsbury, Conn.

[73] Assignee: The United States of America as represented by the United States Energy Research and Development Administration, Washington, D.C.

[22] Filed: Aug. 20, 1974

[21] Appl. No.: 499,104

Related U.S. Application Data

[63] Continuation of Ser. No. 345,421, March 27, 1973, abandoned.

[52] U.S. Cl. .................... 75/139; 176/88; 176/91 R
[51] Int. Cl.² ........................................ C22C 21/12
[58] Field of Search ......... 75/139; 176/38, 88, 91 R

[56] References Cited
UNITED STATES PATENTS
3,725,309   4/1973   Ames et al. .......................... 75/139

*Primary Examiner*—R. Dean
*Attorney, Agent, or Firm*—Dean E. Carlson; Arthur A. Churm; Frank H. Jackson

[57] ABSTRACT

An aluminium alloy containing one weight percent copper has been found to be resistant to void formation and thus is useful in all nuclear applications which currently use aluminium or other aluminium alloys in reactor positions which are subjected to high neutron doses.

1 Claim, 1 Drawing Figure

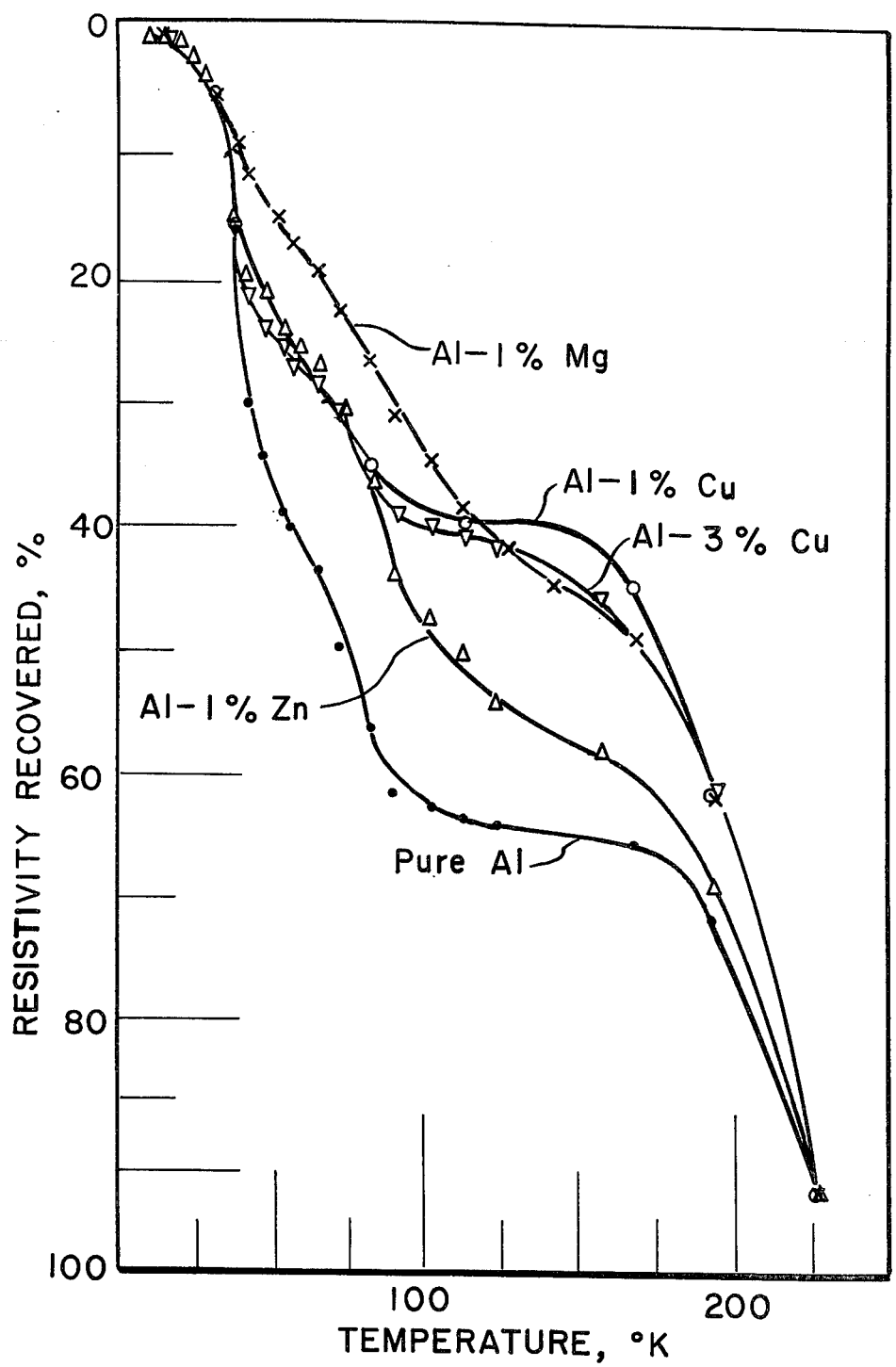

NONSWELLING ALLOY

CONTRACTUAL ORIGIN OF THE INVENTION

The invention described herein was made in the course of, or under, a contract with the UNITED STATES ATOMIC ENERGY COMMISSION.

This is a continuing application from application Ser. No. 345,421, filed Mar. 27, 1973, now abandoned.

BACKGROUND OF THE INVENTION

This invention relates to nonswelling alloys which are useful as cladding materials for nuclear reactor fuel elements or as materials of construction for structural components of the reactor. The invention particularly relates to the use of these alloys in water-cooled reactors operating in the temperature range of from 0° to 200°C. and to neutron fluences greater than $10^{19}$ n/cm² (E > 0.1 MeV). A glossary defining some of the terms used in this description is included for those not familiar with the field of radiation damage.

GLOSSARY void; a form of microporosity which develops in metals during irradiation at temperatures between 0.3 and 0.5 of their absolute melting point.

point defect; a single atom defect in the lattice structure of a metal. This may be either a vacancy or self-interstitial.

vacancy; this refers to the absence of an atom at a regular lattice position.

self-interstitial; this refers to the presence of an atom which normally occupies a lattice position in a position between normal lattice sites.

substitutional solute; this refers to an addition to the metal which can replace the host atoms at regular lattice positions.

dpa; this stands for displacements per atoms which is a measure of the fraction of atoms which have been displaced by the irradiation from their lattice sites. For example, 30 dpa means during the irradiation each atom, on the average, has been displaced 30 times from its lattice site.

Nuclear reactors typically include a plurality of fuel elements containing a nuclear fuel material enclosed within a cladding material which must protect the fuel from the reactor environment and provide adequate containment for fission products formed in the fuel. Aluminium or zirconium are frequently employed as cladding material in water-cooled reactors, magnesium alloys, aluminium or stainless steel in gas-cooled reactors and stainless steel is most frequently employed in liquid-metal-cooled reactors.

The observation that prolific void formation occurs in neutron-irradiated materials used for cladding and for structural components at temperatures between about 0.3 and 0.5 of their absolute melting points at high neutron fluences is comparatively recent. While this problem has been particularly severe in austenitic stainless steels and thus hindered the development of liquid-metal-cooled fast breeder reactors, the problem also exists in reactors employing other structural materials — such as aluminium and zirconium. An example of a reactor which uses aluminium is the High Flux Isotope Reactor located at Oak Ridge, Tenn., where void formation in the aluminium structural components has caused definite problems.

As is to be expected, much work has been done in attempting to identify the basic causes of void formation and swelling and to develop ways of minimizing it, particularly for stainless steel. Much of the work done to the time of publication is summarized in "Radiation-Induced Voids in Metals", AEC Symposium series 26, dated April 1972, available as CONF-710601 from the National Technical Information Service, U.S. Department of Commerce, Springfield, Va., 22151. For example, one of the papers discusses on page 309 et seq. the effect of impurities on void formation in high-purity materials. The author concludes by saying (page 316) "In summary, we cannot be very specific about the role of impurities in void formation. Some, particularly gases, stimulate void formation but do not appear to alter the swelling appreciably. Others inhibit void formation and retard swelling in some presently unidentified manner." Other authors on page 379 conclude broadly that substitutional-type impurities retard void nucleation to higher neutron fluences.

One means of limiting swelling which has been experimentally documented is the formation of a large concentration of precipitate particles in the microstructure.

It was suggested by the discloser of the present invention in the proceedings of the Symposium on Radiation-Induced Voids in Metals, AEC Symposium series 26 (pp. 802, 803) — available as CONF-710601 from National Technical Information Service, U.S. Department of Commerce, Springfield, Va. 22151 — the void formation could also be suppressed through a promotion of point defect recombination at the sites of trapped self-interstitial atoms.

In an earlier investigation, before radiation-induced void formation was known, T. H. Blewitt showed that small amounts (1%) of solute can strongly trap self-interstitials. "Low Temperature Irradiation Studies", Proc. of Int'l School of Physics, E. Fermi, XVIII Corso, *Radiation Damage in Solids*, pp. 630–716, Academic Press, New York, 1962. Additions of only 0.1% of beryllium or silicon to copper raised the stage 1 annealing peak from 50° to 200°K. for the beryllium addition and to 115°K. for the silicon addition. It will be observed that all of this work was carried out at much lower temperatures than those of interest to the reactor designer and that no attempt was made to develop guidelines for selecting alloy additions that will strongly trap self-interstitials. Blewitt's interpretation of these results was that, since stage 1 annealing is generally attributed to close-pair recombination of vacancies and self-interstitial atoms and since vacancies are immobile in copper at these temperatures, a large fraction of the interstitials must have been trapped by the solute additions. Since beryllium causes the copper lattice to contract and silicon causes it to expand, apparently atoms both larger and smaller than the matrix metal can have a significant binding energy to a self-interstitial atom.

SUMMARY OF THE INVENTION

Two means of limiting void formation in aluminium, a metal important to nuclear reactor industry, were incorporated in an aluminium alloy without significantly changing other properties of the alloy. One weight percent addition of copper (0.42 atomic percent) produced a high density of precipitate during irradiation. In addition copper in solution was shown to result in strong trapping of self-interstitial atoms. Both of these factors contributed to the strong resistance of the Al - 1 wt % Cu alloy to void formation. Al - 1 wt % Cu is therefore useful in all nuclear applications which currently use aluminium or other aluminium alloys in reactor positions which are subjected to high neutron doses.

Samples taken from the sheet specimens of each of the alloys were subsequently bombarded with 4 MeV nickel ions at 100°C. to 30 dpa to determine their void formation characteristics. The results are summarized in Table I.

TABLE I

EFFECTS OF 4 MeV Ni+ BOMBARDMENT ON Al ALLOYS

| | Ave. Void Diam., A | Void Concentration $10^{14}/cm^3$ | Void Volume Fraction | Comments |
|---|---|---|---|---|
| Pure aluminium | 280 | 1.5 | $1.7 \times 10^{-3}$ | Tangle dislocation structure. |
| Al — 1 wt. % Zn | 150 | 1.0 | $1.7 \times 10^{-4}$ | Tangle dislocation structure, little precipitate. |
| Al — 1 wt. % Mg | 150 | 1.4 | $2.5 \times 10^{-4}$ | Tangle dislocation structure, little precipitate. |
| Al — 1 wt. % Cu | — No voids | — | — | Precipitate, $5 \times 10^{15}$, 60 Å diam. |

BRIEF DESCRIPTION OF THE DRAWING

The FIGURE is a graph containing a family of curves showing the effect on the resistivity recovery of pure aluminium of the addition of several different alloying elements thereto.

SPECIFIC EMBODIMENT OF THE INVENTION

For the purposes of this invention it was important to determine if self-interstitial trapping by solute atoms occurred in aluminium alloys and, in turn, if it occurred whether or not it significantly affected the void formation characteristics of the material. To this end a series of aluminium alloys were made containing one weight percent additions of magnesium (Mg), zinc (Zn), and copper (Cu) and 3 weight percent copper. Each alloy was heat treated to retain the maximum amount of solute in solid solution. From each alloy a small amount of wire and sheet were fabricated. The wire was used to gain a measure of the amount of self-interstitial trapping which occurred in each alloy through an experiment similar to that which Blewitt had performed on copper alloys.

The wire specimens were irradiated in the CP-5 reactor at Argonne National Laboratory at liquid-helium temperatures for two weeks in a fast spectrum. After irradiation the reactor was shut down and the samples were pulse-annealed (15 minutes at each temperature). The resistivity changes during irradiation and annealing were continuously monitored. Following the explanation presented in the first section of this disclosure, FIG. 1 demonstrates that all additions resulted in some trapping of self-interstitials, with copper additions resulting in the most. The fact that 1 and 3 weight percent additions of copper gave the same results indicates the process is quite insensitive to concentration of solute.

The fact that both the magnesium and zinc addition resulted in significantly less swelling than in the pure aluminium samples strongly suggests that self-interstitial trapping is an effective means of reducing void formation since the magnesium and zinc additions resulted in no other observable changes in the microstructure. The Al - 1 wt. % Cu alloy formed a fine dispersion of coherent precipitate and no voids. It is therefore concluded that a 1 weight percent addition of copper to aluminium results in an alloy which is highly resistant to void formation through promotion of point defect recombination by trapping self-interstitial atoms and by the development of a high concentration of precipitate. The specific heat treatment given to the Al - 1 wt. % Cu alloy prior to irradiation was a solution treatment for one-half hour at 510°C. followed by a water quench.

It is contemplated that further investigation will also identify alloying additions to stainless steel and other materials of construction for nuclear reactors which will minimize radiation-induced swelling through promotion of point defect recombination by trapping self-interstitial atoms.

The embodiments of the invention in which an exclusive property or privilege is claimed are defined as follows:

1. In a water-cooled nuclear reactor designed for operation in the temperature range of from 0° to 200°C. and to neutron fluences greater than $10^{19}$ n/cm$^2$ (E > 0.1 MeV), the improvement wherein the fuel element cladding and structural material of the reactor consists of an alloy containing 99% aluminum and 1% copper whereby swelling of the cladding and structural material will not occur under irradiation since the alloy exhibits little swelling upon irradiation due to the combined effects of substitutional solute interstitial trapping and second-phase precipitation.

* * * * *